United States Patent Office 3,304,627
Patented Feb. 21, 1967

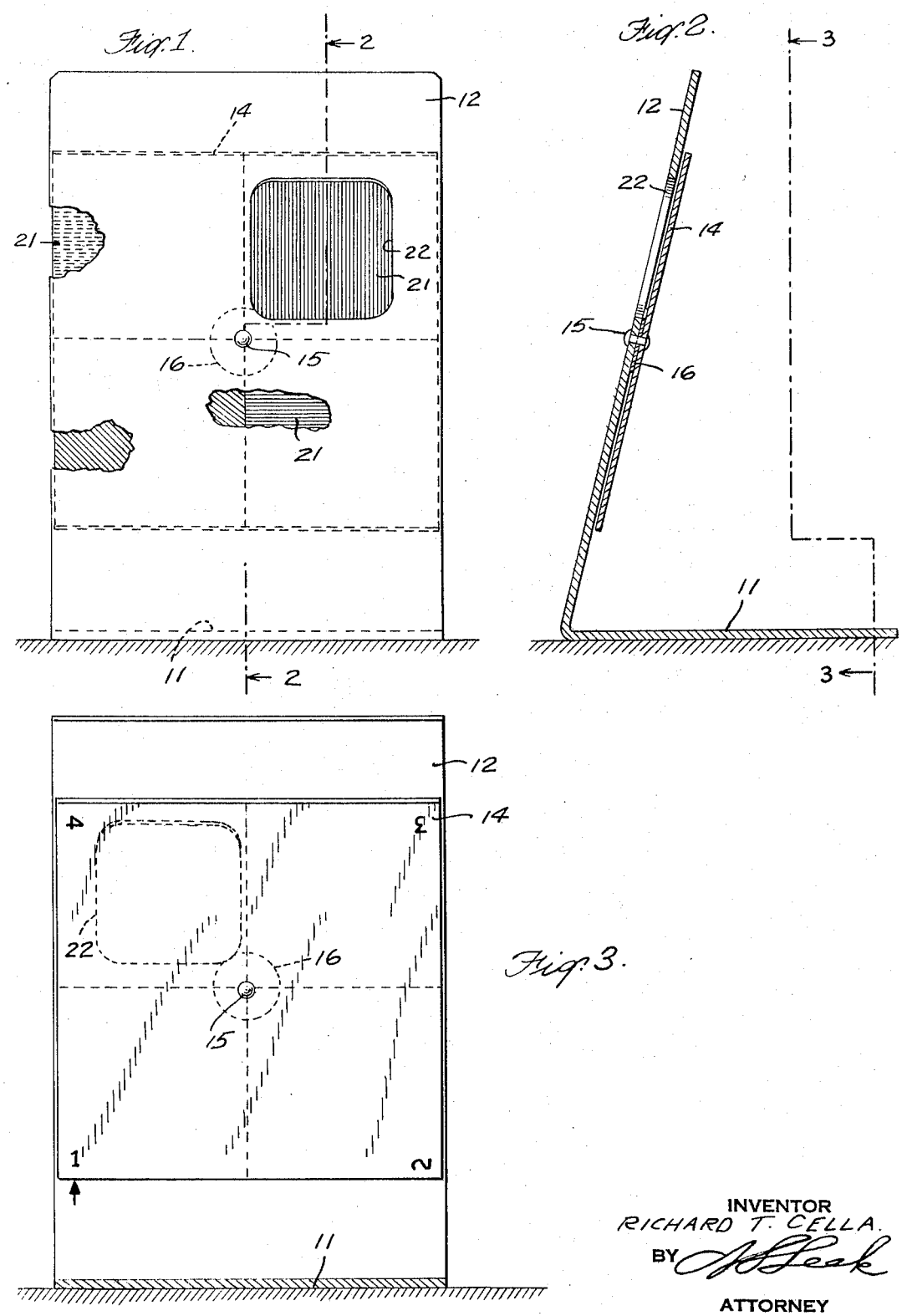

3,304,627
EDUCATIONAL DEVICE
Richard T. Cella, 35 Park Ave., New York, N.Y. 10016
Filed Feb. 4, 1966, Ser. No. 525,097
1 Claim. (Cl. 35—8)

This invention relates to educational devices and more particularly to a device for indicating to an instructor at a glance the answers to a multiple choice question which have been selected by the various students in a class.

More specifically, the invention provides an indicator having a rotating panel which is set by the student to a position corresponding to the selected answer. For example, if the question includes four possible answers, one of which is to be selected by the student, the indicator will comprise a movable panel having numbers 1 to 4 on one face by means of which the student positions the panel. The opposite face of the panel, which is visible to the instructor, contains readily recognizable designations which can be seen from the instructor's location. These designations may comprise differently colored areas one of which is visible in each position of the panel. This enables the instructor to determine at a glance the answers which have been selected by each of the students.

An object of the invention is to provide an educational device of the above type which is simple and convenient to operate and economical to manufacture.

The nature of the invention will be better understood from the following description, taken in connection with the accompanying drawing in which a specific embodiment has been set forth for purposes of illustration.

In the drawing:

FIG. 1 is a front elevation of the device with parts broken away for clarity;

FIG. 2 is a vertical section taken on the line 2—2 of FIG. 1; and

FIG. 3 is a vertical section taken on the line 3—3 of FIG. 2 showing the rear face of the indicating panel.

Referring to the drawing more in detail the device is shown as comprising a base 11 carrying an upwardly extending and rearwardly inclined front support panel 12. An indicator panel 14 is rotatably mounted on the rear side of the support panel 12 by means of a rivet 15 and a spacing washer 16. The rotatable panel 14 may be of any desired shape but has been shown as substantially square to provide four straight sides to facilitate the positioning thereof in accordance with a four part question. For use with other multiple part questions, a polygonal panel having the corresponding number of sides or a circular disc may be used.

The rotatable panel 14 is held under sufficient friction for retaining its selected position but at the same time is easily rotatable by hand to the position selected by the student.

The rear face of the rotating panel 14 carries designations such as numbers or letters in selected positions corresponding to the positions in which the panel is to be set. In the form shown, four such numbers 1 to 4 are disposed at the lower left hand corners of the panel. A mark may be made on the rear face of the support panel 12 to register with the number when the panel is in the correct selected position.

The front face of the panel 14 carries a series of designations indicated as colored areas 21 which are positioned to register with an opening 22 in the support panel 12 to designate the selected position of the panel 14. In operation, each student is provided with an indicator device of the above type. When he selects an answer to the multiple choice question, he sets the panel 14 to the corresponding number and sets the device in upright position so that the front face of the support panel 12 is visible to the instructor, thus exposing a color through the opening 22 which indicates to the instructor whether the student has selected the correct answer. By glancing at all of the panels, he can readily note which if any of the selected answers are incorrect.

What is claimed is:

The method of determining at a glance by an instructor the answers to a multiple choice question which have been selected by a plurality of students each of whom is provided with an educational device comprising a base carrying at its forward edge an upstanding support panel, said support panel being rearwardly inclined over said base for stability, an indicator disc rotatably mounted on the rear face of said support panel, said indicator disc having its rear face exposed and carrying a series of designations to be selectively positioned at a predetermined point by suitable rotation of said indicator disc, said indicator disc having a forward face concealed by said support panel and a series of designations registering with said first mentioned designations, said support panel having an opening registering with one of said last designations on said indicator disc to indicate thereby the selected position of said disc, which method comprises selectively setting each indicator disc in accordance with the selected answer while the support panel is held face down by the student, then positioning each such device on its base to expose the front of the support panel to view by the instructor whereby the answer selected by each student can be determined at a glance by viewing the designation exposed through the opening in said support panel.

References Cited by the Examiner
UNITED STATES PATENTS

| 1,351,362 | 8/1920 | Bailey | 116—133 |
| 1,587,685 | 6/1926 | Tillinghast | 35—74 |
| 1,636,991 | 7/1927 | Fueglein | 35—74 |
| 2,595,980 | 5/1952 | Neubauer et al. | 116—33 |
| 3,114,212 | 12/1963 | Cisin | 35—9 |
| 3,166,860 | 1/1965 | Delaney | 35—48 |
| 3,180,310 | 4/1965 | Giebel | 116—133 |

EUGENE R. CAPOZIO, Primary Examiner.

S. M. BENDER, W. W. NIELSEN, Assistant Examiners.